United States Patent
Yanai et al.

(10) Patent No.: US 6,418,509 B1
(45) Date of Patent: Jul. 9, 2002

(54) SYSTEM AND METHOD FOR DISK MAPPING AND DATA RETRIEVAL

(75) Inventors: Moshe Yanai; Natan Vishlitzky, both of Brookline; Bruno Alterescu, Newton; Daniel Castel, Framingham, all of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/711,212

(22) Filed: Nov. 9, 2000

Related U.S. Application Data

(60) Division of application No. 09/305,127, filed on May 4, 1999, now Pat. No. 6,185,653, which is a continuation of application No. 08/851,701, filed on May 6, 1997, now Pat. No. 5,909,692, which is a continuation of application No. 08/665,607, filed on Jun. 18, 1996, now Pat. No. 5,664,144, which is a division of application No. 08/052,039, filed on Apr. 23, 1993, now Pat. No. 5,544,347, which is a continuation-in-part of application No. 07/586,796, filed on Sep. 24, 1990, now Pat. No. 5,206,939, which is a continuation-in-part of application No. 07/587,247, filed on Sep. 24, 1990, now Pat. No. 5,269,011, which is a continuation-in-part of application No. 07/587,253, filed on Sep. 24, 1990, now Pat. No. 5,335,352.

(51) Int. Cl.[7] .............................................. G06F 12/08
(52) U.S. Cl. ........................... 711/112; 711/202; 711/4; 710/68
(58) Field of Search ........................... 710/68; 711/112, 711/202, 4

(56) References Cited

U.S. PATENT DOCUMENTS

| | | | |
|---|---|---|---|
| 4,262,332 A | 4/1981 | Bass et al. | 711/114 |
| 4,310,883 A | 1/1982 | Clifton et al. | 707/205 |
| 4,467,421 A | 8/1984 | White | 711/118 |
| 4,500,954 A | 2/1985 | Duke et al. | 711/138 |
| 4,533,996 A | 8/1985 | Hartung et al. | 710/3 |
| 4,593,354 A | 6/1986 | Ushiro | 714/48 |

(List continued on next page.)

FOREIGN PATENT DOCUMENTS

| | | |
|---|---|---|
| WO | WO 91/06053 | 5/1991 |
| WO | WO 91/08536 | 6/1991 |
| WO | WO 91/08537 | 6/1991 |

OTHER PUBLICATIONS

US 4,533,955, 08/1985, Christian et al. (withdrawn)
R.D. Tennison, "Compacting Indexed Data," IBM Technical Disclosure Bulletin, vol. 24, No. 7A, Dec. 1981, pp. 3202–3203.

(List continued on next page.)

*Primary Examiner*—Reginald G. Bragdon
(74) *Attorney, Agent, or Firm*—Howrey Simon Arnold & White, LLP

(57) ABSTRACT

An apparatus and method for disk mapping and data retrieval includes a data storage medium on which has been stored a plurality of data records. Each record includes at least a record identification portion, for uniquely identifying each record from among the plurality of data records. The apparatus builds a record locator table in high speed semiconductor memory which comprises the unique record identifiers for the records on the storage medium as well as a record locator index generated by the apparatus, which indicates the address of the data record on the storage medium. Data retrieval is facilitated by first searching the record locator table in high speed semiconductor memory for a requested data record. Utilizing the record locator index associated with the requested data record, the system directly H: accesses the requested data record on the storage medium thereby minimizing storage medium search time. Also disclosed is an apparatus and method for converting CKD formatted data records to FBA formatted disk drives and for building and compressing the "count" portion of the CKD data formatted record into a record locator table.

10 Claims, 6 Drawing Sheets

U.S. PATENT DOCUMENTS

| | | | |
|---|---|---|---|
| 4,686,620 A | 8/1987 | Ng | 707/10 |
| 4,780,808 A | 10/1988 | Moreno et al. | 711/4 |
| 4,825,406 A | 4/1989 | Bean et al. | 710/38 |
| 4,837,675 A | 6/1989 | Bean et al. | 714/5 |
| 4,837,680 A | 6/1989 | Crockett et al. | 710/104 |
| 4,862,411 A | 8/1989 | Dishon et al. | 711/167 |
| 4,875,155 A | 10/1989 | Iskiyan et al. | 711/113 |
| 4,914,656 A | 4/1990 | Dunphy, Jr. et al. | 714/710 |
| 4,939,598 A | 7/1990 | Kulakowski et al. | 360/48 |
| 4,993,030 A | 2/1991 | Krakauer et al. | 714/6 |
| 5,072,378 A | 12/1991 | Manka | 714/6 |
| 5,124,987 A | 6/1992 | Milligan et al. | 714/7 |
| 5,155,809 A | 10/1992 | Baker et al. | 709/227 |
| 5,155,845 A | 10/1992 | Beal et al. | 714/6 |
| 5,206,939 A | 4/1993 | Yanai et al. | 711/4 |
| 5,237,675 A | 8/1993 | Hannon, Jr. | 710/68 |
| 5,247,638 A | 9/1993 | O'Brien et al. | 710/68 |
| 5,263,145 A | 11/1993 | Brady et al. | 711/114 |
| 5,301,304 A | 4/1994 | Menon | 703/24 |
| 5,414,834 A | 5/1995 | Alexander et al. | 707/100 |
| 5,909,692 A | 6/1999 | Yanai et al. | 711/4 |

OTHER PUBLICATIONS

N.K. Ouchi, "System for Blocking Variable–Length Records," IBM Technical Disclosure Bulletin, vol. 16, No. 4, Sep. 1973, pp. 1239–1240.

IBM Publication GA 33–1528–2, Third Edition, "IBM 4321/4331 Processors Compatibility Features," Sep. 1982, pp. 1–1, 1–4, 1–5, 2–1, 2–2, and 2–3.

Patterson et al., A Case for Redundant Arrays of Inexpensive Disks (RAID), Report No. UCB/CSD 87/391, Computer Science Division (EECS), University of California, Berkeley, California, Dec. 1987 (pp. 1 to 24).

Patterson et al., "Introduction to Redundant Arrays of Inexpensive Disks (RAID)," COMPCON 89 Proceedings, Feb. 27–Mar. 3, 1989, IEEE Computer Society, pp. 112–117.

Ousterhout et al., "Beating the I/O Bottleneck: A Case for Log–Structured File Systems," Operating Systems Review, vol. 23, No. 1, ACM Press, Jan., 1989, pp. 11–28.

Douglis et al., "Log Structured File Systems," COMPCON 89 Proceedings, Feb 27–Mar. 3, 1989, IEEE Computer Society, pp. 124–129.

Jeff Moad, "Relief for Slow Storage Systems," Datamation, Sep. 1, 1990, pp. 25–28.

Storage Technology Corporation's Responses to Plaintiff's Interrogatories Nos. 4–5, EMC Corp. v. Storage Technology Corp., Civil Action No. 94–482, in the United States District Court for the District of Delaware, Jan. 19, 1995, pp. 1–5.

Storage Technology Corporation's Outline of the Issues for the Sep. 7 and 8 Mediation, EMC Corp. v. Storage Technology Corp., Civil Action No. 94–482, in the United States District Court for the District of Delaware.

Stipulated Protective Order, EMC Corp. v. Storage Technology Corp., Civil Action No. 94–482, in the United States District Court for the District of Delaware, pp. 1–10.

Storage Technology Corporation's Third Supplemental Responses to Plaintiff's Interrogatories Nos. 1–3, EMC Corp. v. Storage Technology Corp., Civil Action No. 94–482, in the United States District Court for the District of Delaware, Oct. 18, 1995, pp. 1–17 & pp. 1–3 Notice of Service.

Storage Technology Corporation's Supplemental Responses to Plaintiff's Interrogatories Nos. 1–3, EMC Corp. v. Storage Technology Corp., Civil Action No. 94–482, in the United States District Court for the District of Delaware, May 16, 1995, pp. 1–31.

Plaintiff EMC Corporation's Response to Defendant's Third Set of Interrogatories Nos. 18, Jun. 30, 1995, EMC Corp. v. Storage Technology Corp., Civil Action No. 94–482, in the United States District Court for the District of Delaware, pp. 1–10.

SYSTEM AND METHOD FOR DISK MAPPING AND DATA RETRIEVAL

RELATED APPLICATIONS

This application is a divisional of U.S. Ser. No. 09/305,127 filed May 4, 1999 (U.S. Pat. No. 6,185,653 issued Feb. 6, 2001, which is a continuation of application Ser. No. 08/851,701 filed May 6, 1997, issued Jun. 1, 1999, as U.S. Pat. No. 5,909,692, which is a continuation of application Ser. No. 08/665,607, filed Jun. 18, 1996, issued as U.S. Pat. No. 5,664,144 on Jun. 18, 1996. U.S. Ser. No. 08/655,607 is a divisional of U.S. patent application Ser. No. 08/052,039 filed Apr. 23, 1993, entitled REMOTE DATA MIRRORING (U.S. Pat. No. 5,544,347 issued Aug. 6, 1996), which is a continuation-in-part of U.S. patent application Ser. No. 07/586,796 filed Sep. 24, 1990 entitled SYSTEM AND METHOD FOR DISK MAPPING AND DATA RETRIEVAL (U.S. Pat. No. 5,206,939 issued Apr. 27, 1993); U.S. Ser. No. 07/587,247 filed Sep. 24, 1990 entitled DYNAMICALLY RECONFIGURABLE DATA STORAGE SYSTEM WITH STORAGE SYSTEM CONTROLLERS SELECTIVELY OPERABLE AS CHANNEL ADAPTERS OR STORAGE DEVICE ADAPTERS (U.S. Pat. No. 5,269,011 issued Dec. 7, 1993) and U.S. Ser. No. 07/587,253 filed Sep. 24, 1990 entitled RECONFIGURABLE MULTI-FUNCTION DISK CONTROLLER SELECTIVELY OPERABLE AS AN INPUT CHANNEL ADAPTER AND A DATA STORAGE UNIT ADAPTER (U.S. Pat. No. 5,335,352 issued Aug. 2, 1994).

The following disclosure in this application is the disclosure in U.S. patent application Ser. No. 07/586,796 as filed on Sep. 24, 1990 and entitled SYSTEM AND METHOD FOR DISK MAPPING AND DATA RETRIEVAL (U.S. Pat. No. 5,206,939 issued Apr. 27, 1993), which is fully incorporated herein by reference.

FIELD OF THE INVENTION

This invention relates to data storage on disk drives and more particularly, to a method and apparatus for retrieving data records stored on a storage medium utilizing a data record locator index stored in memory.

BACKGROUND OF THE INVENTION

Large disk storage systems like the 3380 and 3390 direct access storage devices (DASD) systems employed with many IBM mainframe computer systems are implemented utilizing many disk drives. These disk drives are specially made to implement a count, key, and data (CKD) record format on the disk drives. Disk drives utilizing the CKD format have a special "address mark" on each track signifying the beginning of a record on the track. After the address mark comes the three part record beginning with the "COUNT" which serves as the record ID and also indicates the lengths of both the optional key and the data portions of the record, followed by the optional "KEY" portion, which in turn is followed by the "DATA" portion of the record.

Although this format gives the system and user some flexibility and freedom in the usage of the disk drive, this flexibility forces the user to use more complicated computer programs for handling and searching data on the disk. Since the disk drive track has no physical position indicator, the disk drive controller has no idea of the data which is positioned under the read/write head at any given instant in time. Thus, before data can be read from or written to the disk drive, a search for the record must be performed by sequentially reading all the record ID's contained in the count field of all the records on a track until a match is found. In such a search, each record is sequentially searched until a matching ID is found. Even if cache memory is used, all the records to be searched must first be read into the cache before being searched. Since searching for the record takes much longer than actual data transfer, the disk storage system spends a tremendous amount of time searching for data which drastically reduces system performance.

Disk drives employing what is known as a Fixed Block Architecture (FBA) are widely available in small, high capacity packages. These drives, by virtue of their architecture, tend to be of higher performance than drives employing a CKD format. Such FBA drives are available, for example, from Fujitsu as 5.25" drives with 1 gigabyte or greater capacity.

The distinct advantage of utilizing many small disk drives is the ability to form a disk array. Thus a large storage capacity can be provided in a reduced amount of space, and storage redundancy can be provided in a cost effective manner. A serious problem arises, however, when trying to do a "simple" conversion of data from CKD formatted disks to FBA disks. Two schemes for such a conversion have been considered which do not provide an acceptable solution to the conversion problem. The first of such schemes involves placing every field i.e. Count, Key and. Data, of the CKD formatted record into a separate block on the FBA disk drive. Although this scheme does not waste valuable disk space when CKD formatted records contain large amounts of data, the "Count" field which is very short (8 bytes) occupies an entire block which is typically at least 512 bytes. For example, a. CKD formatted record containing 47K bytes of data could be converted to 95 blocks of FBA disk, 512 bytes in length. In such a conversion, one block would be used to store the count of the record while 94 blocks (47K bytes length of data divided 512 bytes of FBA disk block) would be used to store data, for a total of 95 blocks. However, search time for finding the desired record is still a problem since all the records must be sequentially searched.

For records having very short data lengths such as eight bytes, however, one full track, or 94 CKD formatted data records would need 188 blocks on the FBA disk: 94 blocks for the count portion of the records and 94 blocks for the data portion of the records, even though each data record may only occupy 8 bytes of a 512 byte FBA block. Such a scheme may thus waste nearly 50% of the disk space on an FBA disk drive.

The second scheme for converting data from CKD to FBA drives involves starting each CKD record in a separate block and then writing the complete record in sequential blocks. Utilizing such a scheme, the first FBA block will contain the "count" portion of the record as well as the optional key portion and the start of the data portion of the record. This scheme, however, produces serious system performance degradation when data must be written to the disk, since before writing data to the disk, the entire record must first be read into memory, modified, and subsequently written back to the disk drive. Such a loss in system performance is generally unacceptable.

SUMMARY OF THE INVENTION

This invention features an apparatus and method for retrieving one or more requested data records stored on a storage medium by searching for a data record identifier and associated data record locator index stored in high speed semiconductor memory. The apparatus receives one or more data records, each of the data records including at least a record identification portion and a data portion. The apparatus transfers and stores the data records to one or more data storage mediums. As the records are transferred to the data storage medium, the apparatus of the present invention generates a plurality of record locator indices, each of the record locator indices corresponding to one of the plurality of data records, for uniquely identifying the location of each of the data records stored on the storage medium.

The apparatus further includes high speed semiconductor memory for storing at least the plurality of record locator indices and the associated plurality of record identification portions. Upon receiving a request for one or more data records stored on the storage mediums, the apparatus of the present invention searches the high speed semiconductor memory utilizing the data record identification portion and locates the corresponding record locator index associated with the requested data record. The apparatus then directly retrieves the data record from the storage medium using the record locator index located during the search of semiconductor memory.

In the preferred embodiment, the data records are received in CKD format and stored on an FBA formatted disk drive. The record identification portions and associated record locator indices are combined to form one record locator table stored in one or more blocks of the FBA formatted disk drive and also copied in the high speed semiconductor memory.

A method for retrieving one or more requested data records stored on a storage medium is disclosed utilizing a data record locator index stored in memory and includes the steps of receiving a plurality of data records, each record including at least a record identification portion and the data portion, and transferring and storing the data records to one or more storage mediums. The method also includes generating a plurality of record locator indices, each of which are associated with one of the plurality of data records and uniquely identify the location of the each of the plurality of data records stored on the storage medium. Also included are the steps of storing at least a plurality of record locator indices and the associated plurality of record identification portions in memory. In response to a request for access to one or more of the plurality of data records, the method includes searching the memory, locating one or more data record identification portions and associated record locator indices corresponding to the one or more requested data records, and directly retrieving from the storage medium the requested data records as directed by the record locator indices.

In one embodiment, the method of the present invention includes transforming and encoding CKD formatted data records onto one or more FBA disk drives. Also in the preferred embodiment, the step of storing the data record to one or more storage mediums includes storing the data to one or more directly addressable storage mediums, the step of storing further including the steps of transforming and encoding at least the record identification portion of each of the data records, generating a plurality of record locator indices, and combining the transformed and encoded record locator indices and record identification portions, for forming a record locator table stored in a high speed semiconductor memory.

BRIEF DESCRIPTION OF THE DRAWINGS

These, and other features and advantages of the present invention are described below in the following detailed description and accompanying drawings, in which.

DETAILED DESCRIPTION OF THE INVENTION

Figure 1:
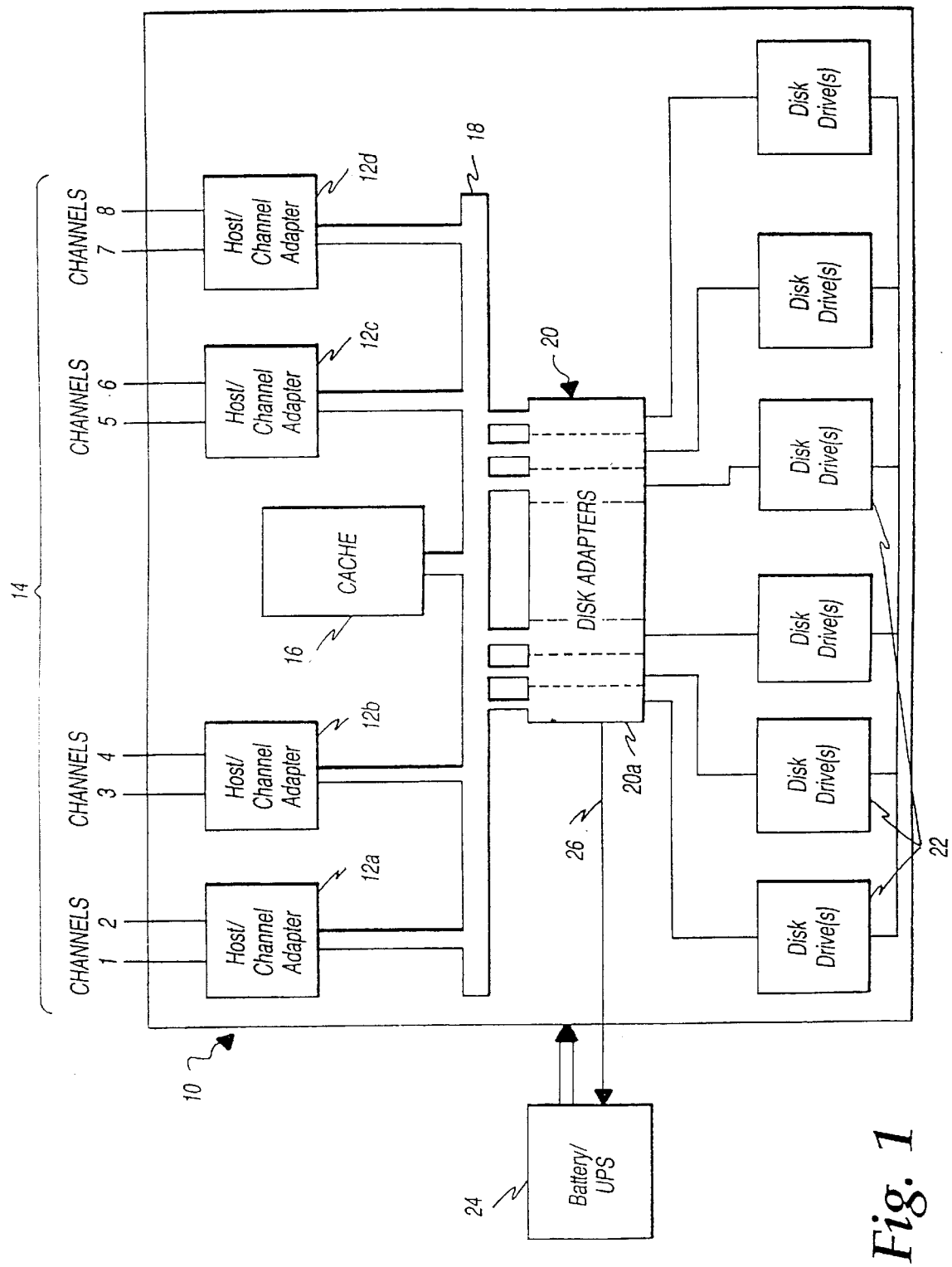
FIG. 1 is a block diagram of a system for disk mapping and data retrieval according to the present invention.

In accordance with the present invention, the disk storage system 10, FIG. 1, for disk mapping and data retrieval includes one or more means for receiving write commands and data such as channel adapter boards 12a–12d. The channel adapter boards are adapted to receive disk read/write commands and data over a plurality of communication channels such as channels 14 from one or more host computers (not shown) over channels identified respectively as 1–8 in FIG. 1.

The channel adapter boards 12a–12d are connected to temporary or cache semiconductor memory storage unit 16 by means of bus 18. Bus 18 is also connected to one or more disk adapter boards 20 which read and write data to one or more disk drive units 22.

Each of the disk drive units 22 may include one or more disk drives, depending upon the user's requirements. Also included in the system is one or more uninterruptable power supply (UPS) 24.

In operation, one or more channel adapter boards 12a–12d receive write commands along with the accompanying data over one or more channels 14 from one or more host computers. In the preferred embodiment, the data is received in CKD format. In order to improve system performance, the disk storage system of the present invention does not wait for disk adapters 20 to locate and update the data on the appropriate disk drives but rather, the channel adapter boards store the data in CKD format in temporary semiconductor memory storage unit or cache 16.

In addition to storing the data that must be written to one or more disk drives 22, channel adapter boards 12a–12d store in the memory, an indication associated with each data record that must be written to disk, indicating to the disk adapters 20 that the associated data record stored in cache must be written to the disk drives. A more detailed description of a disk storage system with write preservation utilizing a write pending indicator is described in U.S. application Ser. No. 07/586,254 filed concurrently with the present application and incorporated herein by reference U.S. application Ser. No. 07/586,254 was continued in U.S. application Ser. No. 156,394 filed Nov. 22, 1993, which issued on Aug. 23, 1994 as U.S. Pat. No. 5,341,493.

Figure 2:
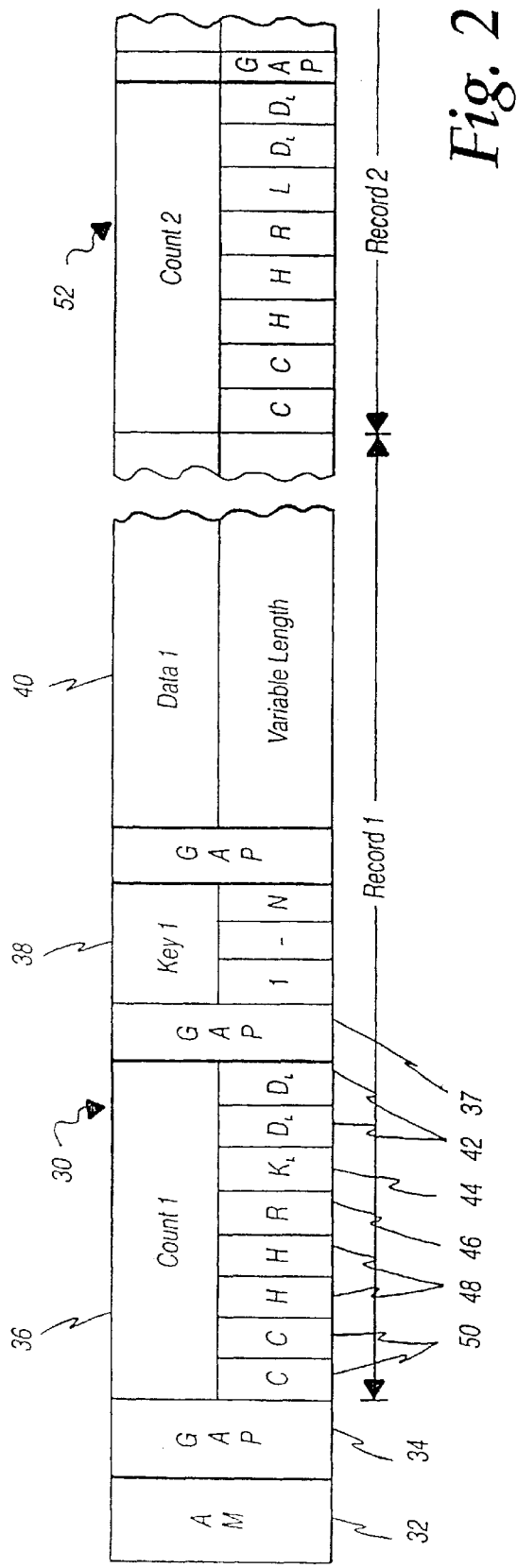
FIG. 2 is a schematic representation of a CKD formatted data record.

In one embodiment, the system and method for disk mapping and data retrieval includes mapping CKD formatted data onto fixed block disk drives. To facilitate understanding of the CKD to FBA data transformation a CKD record 30, FIG. 2 is shown and described below.

In order for a CKD disk drive to locate the first record on any given track, the disk drive read/write head must search the entire track until it encounters a position indicator called an address mark 32. Following a short gap 34 in the track, the first record 30 begins. The CKD record is divided into three fields or portions: the record identification portion, called the count, 36 followed by another gap, 37; the optional key portion 38; and the data portion 40.

The count portion of the data record uniquely identifies this record. The count is the portion of the record that a host system requesting access to a given record presents to the disk drive in order to enable the disk drive to search for and locate the record.

The count is comprised of 8 bytes of information. Bytes 0 and 1, as shown at 42, are used to designate the length of the data, while the third byte, 44, designates the length of the optional key field. The fourth byte 46, designates the record number on the track. The fifth and sixth bytes 48, and the seventh and eighth bytes 50, designate the head and cylinder numbers respectively, at which the record is located on the device. The second record 52, is located immediately following the end of the data portion 40 of the first record 30.

Figure 3:
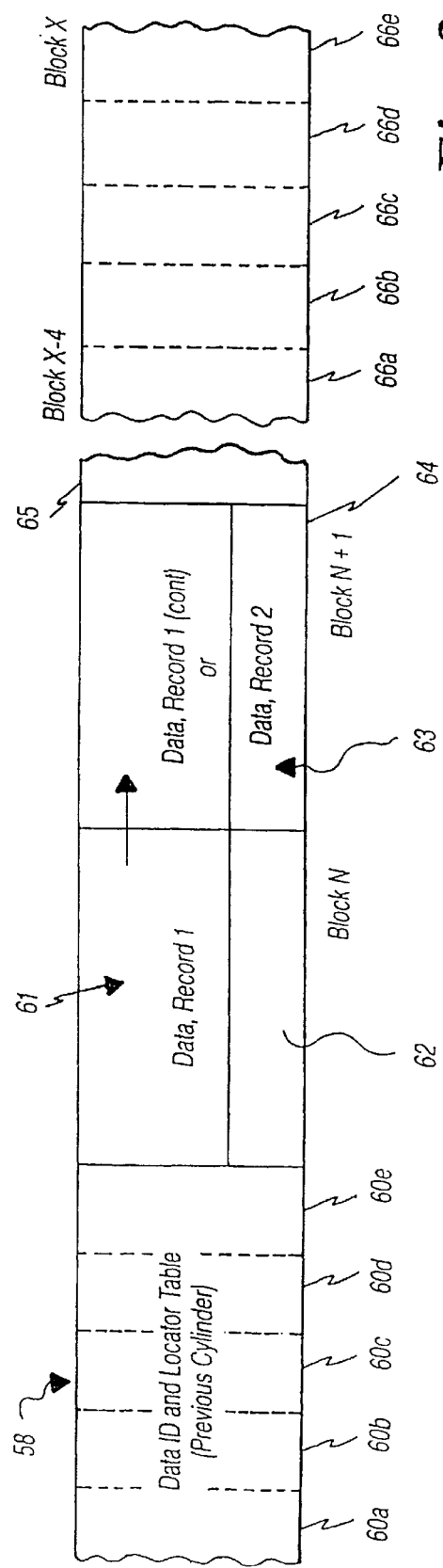
FIG. 3 is a schematic representation of several blocks from a fixed block disk drive in which has been inserted the CKD formatted data transformed according to the method of the present invention.

Thus, in accordance with the present invention, a portion of an FBA disk having CKD formatted data stored thereon is shown in FIG. 3 and includes record identification and locator table 58 including the 5 blocks labeled 60a–60e, for the tracks of the previous cylinder which is organized as described below.

The first data record 61 of the next CKD cylinder being emulated and located on the FBA drive begins in block, 62. If the data portion of the record is longer than the length of the second block 62, the data portion of the first .record will be continued in the next block 64, and subsequent blocks as necessary to store the data portion of the first record. If the length of the first record 61 is equal to or smaller than block 62, any remaining unused portion of block 62 will not be used and instead, the data portion of record 2, 63, will begin in FBA disk drive block 64. This process will repeat itself until all of the blocks of a given cylinder being emulated have been copied. Thus, because the data portion of every record begins at the beginning of a block, (i.e. there is never more than one data record per block), once the system computes the address or block in which a requested data record resides, immediate access is possible with little or no disk drive search time. Utilizing the record identification and locator table of the present invention, the system is able to compute the number of fixed length blocks that must be read to retrieve all the data of a given record, as illustrated herein below. Each record identification and locator table is subsequently loaded into the system memory to facilitate and greatly reduce data record searching and data retrieval time.

Figure 4:
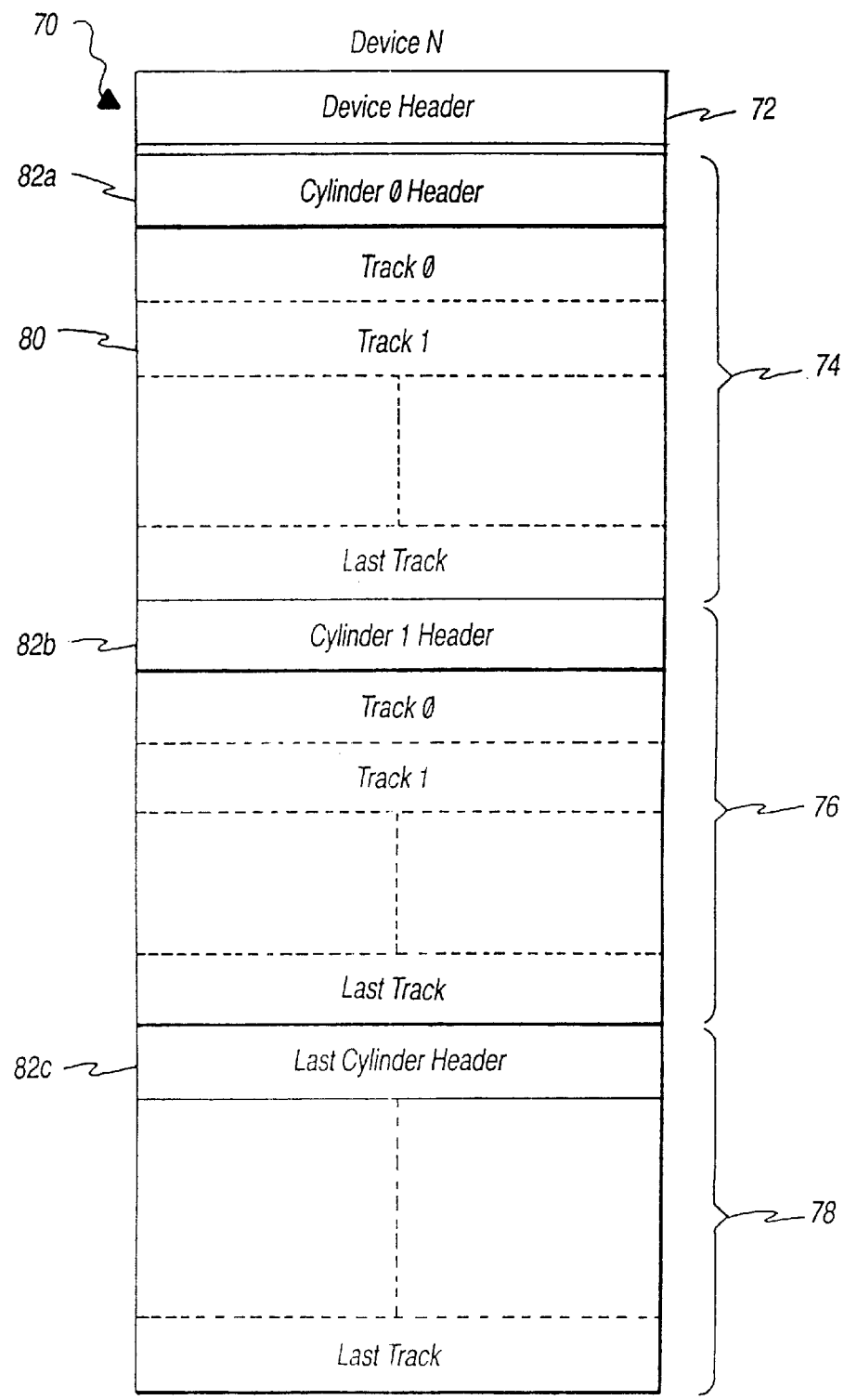
FIG. 4 is a detailed schematic representation of a portion of the data identification and locator table of FIG. 3.

Shown in greater detail in FIG. 4, is a data record and identification table 70 according to the present invention for one device such as one disk drive including multiple cylinders. Each cylinder being emulated includes such a table on the drive itself, as well as a corresponding copy in the semiconductor cache memory.

Each device record identification and locator table includes a header portion 72 followed by one or more cylinder portions 74–78. In turn, each cylinder portion is comprised of a plurality of track portions 80.

Device header portion 72 of the record locator and identification table includes such information as shown in Table 1 below, including the length of the header, line 1; the starting address of the device scratch memory address, line 2; and the length of the device header including the scratch area, line 3. The header also includes one or more bytes for device flags, line 4.

TABLE 1

DEVICE ID TABLE HEADER BUFFER AND FLAG OFFSETS

| 1. DV HEADER | SIZE | $ 1000 | | LENGTH OF DV HEADER AT THE ID TABLE |
| --- | --- | --- | --- | --- |
| 2. DV SCRATCH | OFFSET | DV HEADER | | DV SCRATCH START ADDRESS |
| 3. DV HEADER LENGTH | SIZE | $10000 | | LENGTH OF DV HEADER AT THE ID TABLE INCLUDING THE SCRATCH AREA |
| DV HEADER BUFFERS OFFSETS | | | | |
| 4. DV FLAGS | OFFSET | 0 | | DV TABLE FLAGS |
| 5. DV STATISTICS | OFFSET | 4 | | STATISTICS/RESERVED BYTES |
| 6. DV READ TASK | OFFSET | $ 40 | | READ TASK (ONLY ONE) |
| 7. DV SENSE INFO | OFFSET | $ 60 | | SENSE INFO FOR THIS DV |
| 8. DV TABLE SELECT BUFFER | OFFSET | $ 80 | $40 BYTES | SELECTION BUFFER FOR THE DEVICE |
| 9. RW COUNT BUFFER | OFFSET | $ C0 | 8 BYTES | R/W COUNT COMMAND DATA BUFFER |
| 10. DV WR PEND FLAGS | OFFSET | $100 | $140 BYTES | WR PENDING BIT PER CYLINDER |
| 11. DV WR PEND GROUPS | OFFSET | $240 | $20 BYTES | WR PENDING BIT FOR 8 CYLINDERS |
| 12. DV FLAGS SELECT BUFFER | OFFSET | $280 | $40 BYTES | SELECTION BUFFER FOR UPDATES |
| 13. DV FMT CHANGED FLAGS | OFFSET | $300 | $140 BYTES | FMT CHANGED BIT FOR CYLINDER |
| 14. DV FMT CHANGED GROUPS | OFFSET | $440 | $20 BYTES | FMT CHANGED BIT FOR 8 CYLINDERS |
| 15. DV TEMP BLK | OFFSET | $400 | $200 BYTES | TEMP BLK FOR RECOVERY |
| 16. TEMP CYL ID SLOT | OFFSET | $600 | $A00 BYTES | TEMP ID FOR RECOVERY |

Such flags include a write pending flag which is set if one or more records on the device are temporarily stored in. cache memory awaiting writing and storing to the disk drive, as well as an in-cache bit indicating that at least one record on the device is located in cache memory to speed up access to the record, line 4. Other bytes of the device, header provide various informational, operational, or statistical data to the system.

For example, the write pending group flags shown at line 11 and include one bit indicating a write pending on any one record on any of the 64 preselected consecutive cylinders comprising a cylinder group. Similarly, each cylinder has a write pending flag bit in the device header as shown at line 10. The various write pending flags form a "pyramid" or hierarchy of write pending flags which the system may search when no access to records stored on disks is requested for handling write pending requests. Such a hierarchy structure allows the system to inquire level by level within the structure whether any records on the device; any records within a group of cylinders; any records on a given cylinder; any records on a track; and record by record, whether any write pending flags are set or whether any records are located in cache memory. Such information is useful when processing data such as writing data to disk after a power failure as more fully described in U.S. application Ser. No. 07/586,254 filed concurrently herewith and incorporated herein by reference U.S. application Ser. No. 07/586,254 was continued in U.S. application Ser. No. 156,394 filed Nov. 22, 1993, which issued on Aug. 23, 1994 as U.S. Pat. No. 5,341,493. The "last track" header is a header of a fictitious or non-existent track and serves to indicate that the record locator table was itself modified and must also be written to disk.

A more detailed description of the cylinder header portions 82a–82c of the device record identification and locator table 70 of FIG. 4 is shown in Table 2 wherein any given cylinder header includes such information as the length of the cylinder header, line 1; cylinder write pending flags, line 4; the physical address of the cylinder line 6; and the CRC error check byte of the cylinder, line 7.

Figure 5:
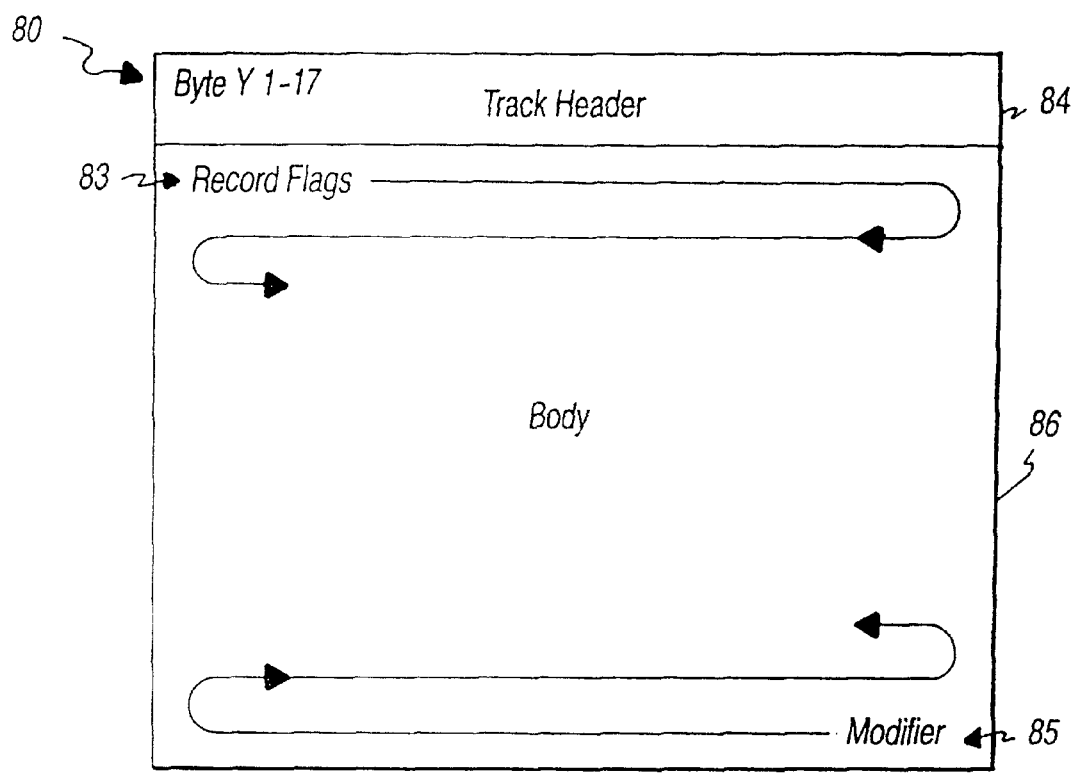
FIG. 5 is a detailed schematic representation of a portion of the data identification and locator table of FIG. 4.

Each track entry in the record identification and locator table is shown in greater detail in FIG. 5 and comprises a track header portion 84 and a track body portion 86. The track header portion 84 includes information as shown in Table 3 below, including a track flag byte, line 1; record-count bytes, line 2; the track CRC check byte, line 3; track compress patterns line 4; and cache address pointer, line 5.

The body 86, FIG. 5 of the track portion of the record identification and locator table includes a plurality of record flags 83, (line 6, Table 3,) beginning at byte 20 and record modifiers 85 (line 7, Table 3) beginning at byte 159 and extending sequentially backward as necessary or until a collision with the record flags 83 occurs.

TABLE 2

CYLINDER ID TABLE HEADER BUFFERS AND FLAGS OFFSETS

| | | | |
|---|---|---|---|
| 1. CYL_HEADER_LENGTH | SIZE | $A0 | LENGTH OF CYL HEADER AT ID TABLE |
| 2. CYL_FLAG | OFFSET | 0 | CYL FLAGS |
| 3. CYL_FLAG_AUX | OFFSET | 1 | ADD ON TO THE ABOVE |
| 4. CYL_WR_PEND_FLAGS | OFFSET | 2 | WR PENDING BIT PER TRACK |
| 5. CYL_STATISTICS | OFFSET | 4 | STATISTICS/RESERVED BYTES |
| 6. CYL_PH_ADD | OFFSET | 16 | PH ADD OF CYL |
| 7. CYL_SLOT_CRC | OFFSET | 23 | CRC OF CYL |

TABLE 3

ID TABLE TRACK HEADER AND BODY OFFSETS

| | | | |
|---|---|---|---|
| 1. TRACK_FLAG | OFFSET | 0 | TRACK FLAGS |
| 2. RECORD_COUNT | OFFSET | 1 | NUMBER OF RECORDS AT THIS TRACK |
| 3. TRACK_CRC | OFFSET | 5 | CRC BYTE FOR TRACK |
| 4. COMPRESS_PATTERNS | OFFSET | 6 | TRACK COMPRESS PATTERNS |
| 5. CACHE_TRACK_POINTER | OFFSET | 14 | POINTER TO CACHE |
| 6. RECORD_FLAGS | OFFSET | 20 → 159 | COMMON FLAG POINTER |
| 7. TRACK_TABLE_BODY (MODIFIER) | OFFSET | 159 → 20 | TRACK BODY |
| TRACK COMMON FLAG BITS | | | |
| 8. DEFECTIVE | BIT | 7 | DEFECTIVE TRACK |
| 9. ALT | BIT | 6 | ALTERNATE TRACK |
| 10. EX_TRACK_TABLE | BIT | 5 | EXTENDED TRACK TABLE SLOT |
| 11. WRT_PEND | BIT | 4 | WRITE PENDING IN TRACK |
| 12. DIAG_CYL | BIT | 3 | DIAGNOSTICS CYL ('CE', 'SA') |
| 13. NOT_USED | BIT | 2 | NOT USED |
| 14. INVALID_ID | BIT | 1 | ID SLOT DEFECTIVE AND INVALID |
| 15. IN_CACHE | BIT | 0 | TRACK IN CACHE FLAG |
| RECORD FLAGS BITS | | | |
| 16. COMPRESS_CODE | BITS | 0-3 | COMPRESS ALGO' FOR THIS RECORD |
| 17. KEY_IN_CACHE | BIT | 4 | KEY FIELD IN CACHE |
| 18. DATA_IN_CACHE | BIT | 5 | DATA FIELD IN CACHE |
| 19. KEY_W_PEND | BIT | 6 | KEY FIELD WRITE PENDING |
| 20. DATA_W_PEND | BIT | 7 | DATA FIELD WRITE PENDING |

The track flags shown on line 1 in table 3 are described in, detail on lines 8–15 and include such bits indicating a defective track bit, line 8; a write pending bit, line 11; and a track in cache bit, line 15. Similarly, the record flag bits of line 6 are shown in greater detail in lines 16–20 including bits comprising the compression algorithm for this record, line 16; key and data fields in cache, lines 17 and 18; and key field and data field write pending bits, lines 19 and 20.

The channel adapters 12a–12d, FIG. 1, receive data and read/write commands from one or more hosts over its respective channels. The data records are provided by the host in CKD format and are stored in cache memory 16 in CKD format. All records stored in cache whether temporarily while awaiting writing to disk, or records which have been read from the disk to be stored in cache for quicker access, are stored in CKD format. When the record is to be written to the disk drive, one of disk adapters 20 reads the data from cache memory over bus 18 and converts the CKD formatted data to the format of the present invention including a record identifier and locator table all of which can be stored in a plurality of fixed blocks before outputting the data over the disk adapters' SCSI interface to one or more of disk drives 22.

Figure 6:
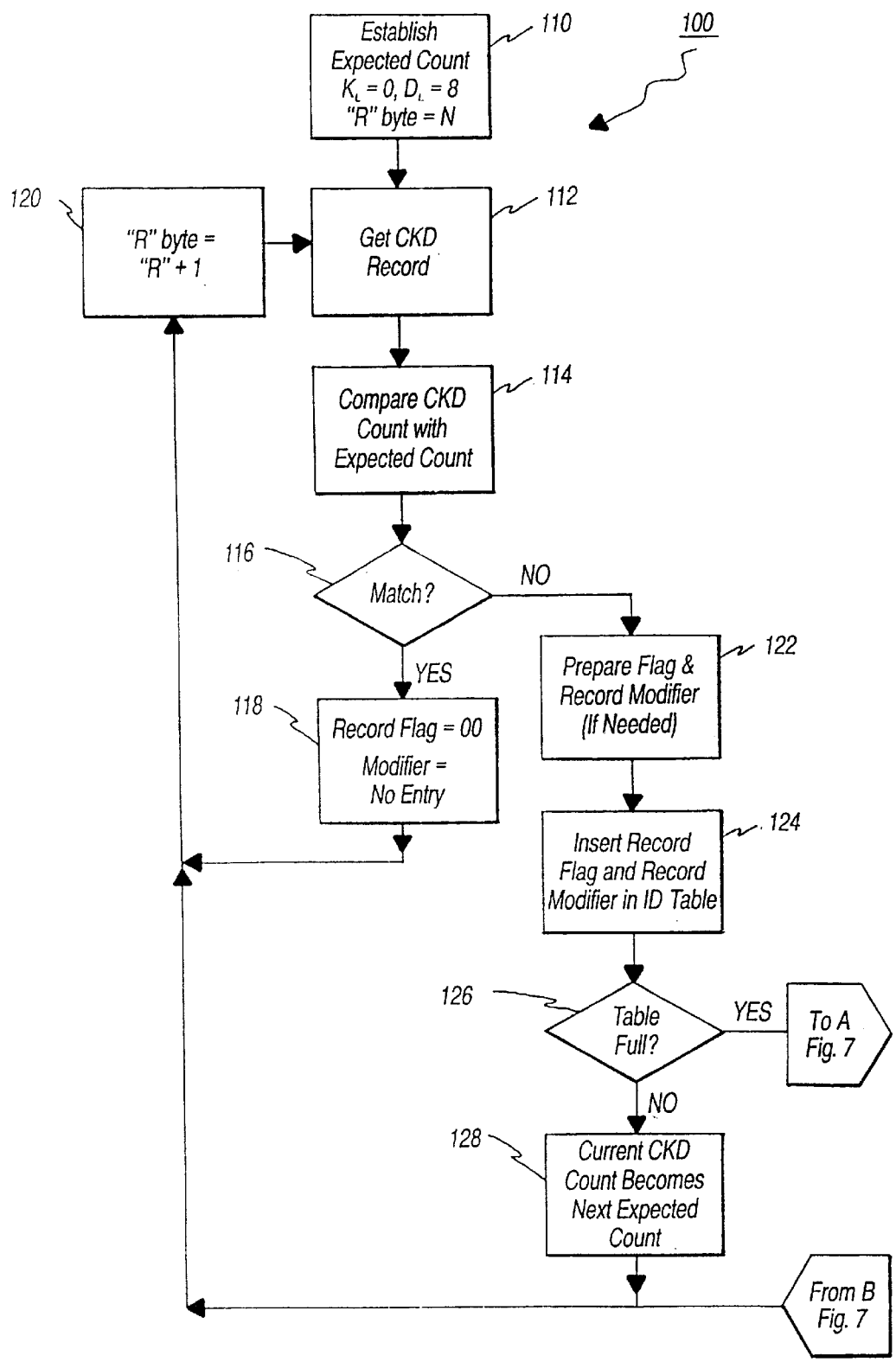
FIG. 6 is a flowchart of the method for transforming CKD formatted data into fixed block data including a method for preparing a record identification and locator table.

The present method for mapping CKD formatted data into fixed block disk drives is, in part, based on the recognition that under usual conditions, a sequence of CKD formatted records will include the "R" portion of the count identifying the record number from among a number of sequentially numbered data records of the same length. Further, the records are generally stored on the same device cylinder and accessed by the same device head. Additionally, the key length will generally be zero or some predetermined generally constant number. Thus, the method for disk mapping 100, FIG. 6 of the present invention includes establishing the profile of an expected record, step 110. In the preferred embodiment, the expected record is established with the count CCHH code as the physical cylinder and head identification, as well as the key length $(K_1)=0$, data length $(D_1)=8$ and the "R" byte of the count assigned as record number (n)=0. Further, the record flags are set to 00.

During step 112, the system employing the method of the present invention obtains the first CKD formatted record and compares the CKD record with the previously established expected record at step 114. At step 116, a determination is made as to whether or not the CKD formatted record including the "count" and record flags match those of the expected data record. If the CKD formatted record and the expected record match, the method proceeds to step 118 wherein the body of the track portion of the record identification and locator table previously discussed in conjunction with FIG. 5 and table 3 is built. Since the CKD formatted record matched the previously established expected data record, the record flag is set to 00 and no entry is made in the record modifier portion of the track ID table. Subsequently, the "R" byte for the record number of the next expected data record is incremented by one, step 120, before returning to the step of obtaining the next CKD formatted data record at step 112.

If the results of the comparison at step 116 indicate that the CKD formatted record does not match the expected data record, the method proceeds to step 122 wherein a change format code (see Table 5) and record modifier, as required, are prepared. Next, the record format code and, if required, record modifier are inserted into the track identification table, step 124. If the track ID table is not full as determined at step 126, processing continues to step 128 wherein the current CKD count becomes the next expected count. Processing then returns to step 120 where the "R" byte is incremented by one before getting the next CKD record at step 112.

Figure 7:
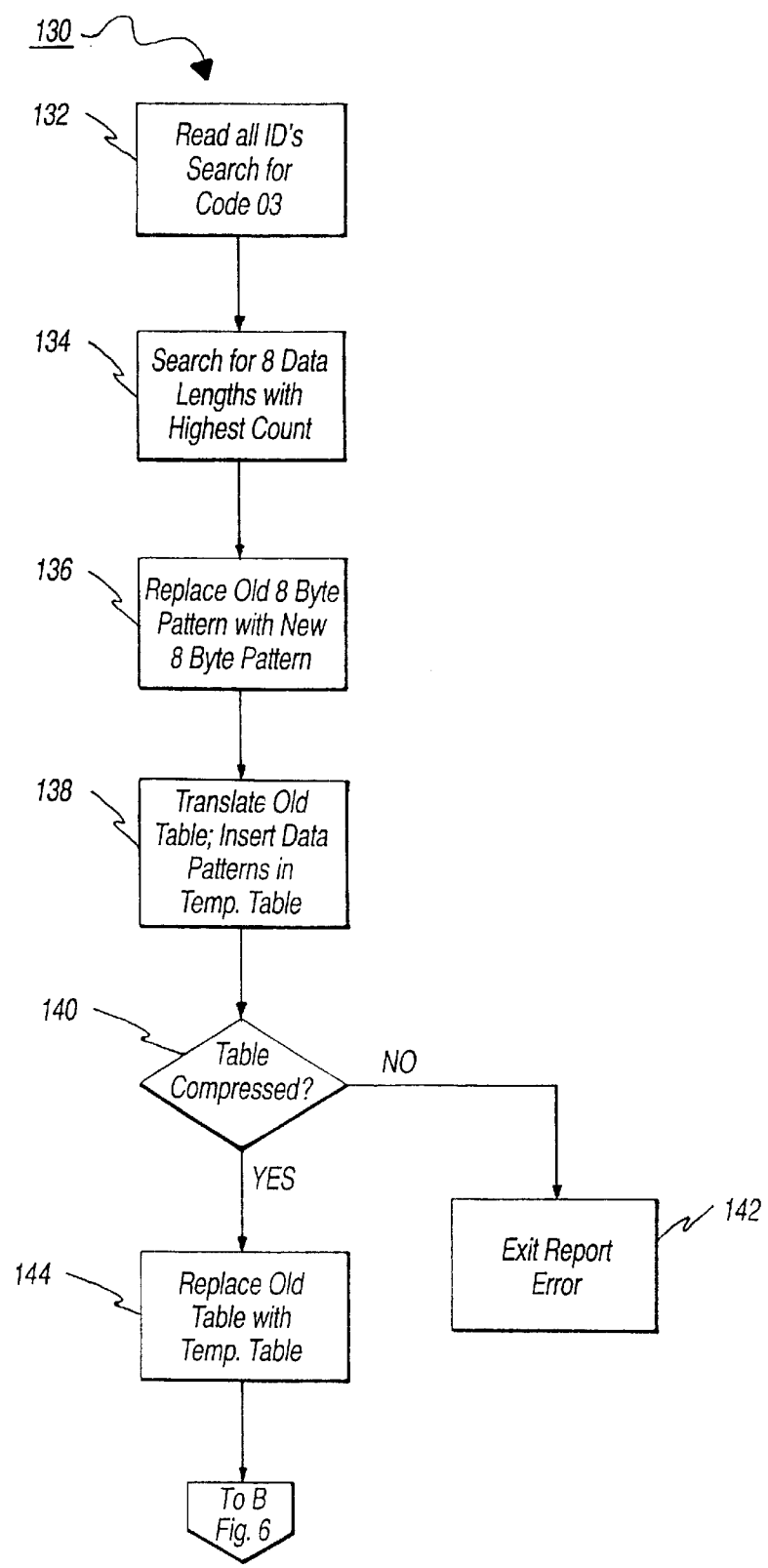
FIG. 7 is a flowchart illustrating the method for compressing the length of the record identification and locator table according to the present invention.

If, as indicated at step 126, the track identification table is full, meaning that the record flag portion of the ID table has collided with the record modifier portion of the ID table, the method of the instant invention will attempt to compress or shrink the body of the track ID table as shown in flowchart 130, FIG. 7. During the compression process of the instant invention, the system and method of the present invention attempt to define from one to eight data lengths which are repeated within this track. Such repeating data lengths are then classified as "patterns" and are thereafter referred to by a pattern "code" in the track header as shown on line 4 of Table 3, thus saving up to 2 bytes in the modifier portion of the track ID table for each repeated data length.

The method of the present invention first reads the ID table, step 132, searching for ID's with format code 03 for repeating values of data lengths, step 134. From those repeating values, the system and method of the present invention build a data length pattern table beginning with the data length that is most frequently repeated, and continuing on to find the seven most repeated data lengths and replaces the old 8 byte pattern with the new 8 byte pattern, step 136.

The method then proceeds to compare the data lengths of all the CKD records of the current track which have previously been read to determine whether or not any of the data lengths match the data patterns loaded in the pattern table, step 138. If any data lengths match the data patterns in the pattern table, the method proceeds to insert the data pattern code for the data length in a temporary ID table. Thus, the replaced record modifiers which previously contained the changed or modified data lengths are now unnecessary and eliminated, thus compressing or shrinking the size of the record identification and locator table and therefore allowing more room for the system to complete reading the CKD records for a given track. The system verifies at step 140, that the ID table was in fact compressed. If no ID table compression was achieved, the system reports an error, step 142. If ID table compression was achieved, the method replaces the old ID table with the temporary ID table with compressed counts, step 144, before returning to step 120, FIG. 6.

Although this count compression routine somewhat reduces system performance, the time to compute repeating data patterns and thus, to compress the "count" information in a record identification and locator table is minimal when compared to the tremendous savings of time which results from the ability to search the record locator table containing the count information in semiconductor memory instead of searching the disk drives for the requested record given the respective access times.

An example of a record identification and locator table for track 0 of a representative disk drive along with decoded information of each record is reproduced below as Table 4. This track identification and record locator table forms part of the device record identification and locator table as discussed previously in conjunction with FIG. 4. Line 2 of Table 4 corresponds to the track header portion 84, FIG. 5 of the track identification table also previously discussed in conjunction with table 3. The second byte of the header, the number "5" indicates that there are five records on this track.

TABLE 4

1. TRACK NUMBER 0
2. FLAGS/COUNT/H/W/R/S/PAT/CACHE/PTR: 00 5 00 00 00 00 0000000000000000 00000000
3. FLAGS          00 01 03 03 01
4. BODY:   0000000000000000 0000000000000000 0000000000000000 0000000000000000
5.         0000000000000000 0000000000000000 0000000000000000 0000000000000000
6.         0000000000000000 0000000000000000 0000000000000000 0000000000000000
7.         0000000000000000 0000000000000000 0000000000000000 000000000000000F
8.         B0E050900418A0

|  | REC # | ID CCHHR | KEY LENGTH | DATA LENGTH | RECORD FLAGS WR PEND | IN CACHE | NON STD | PHYSICAL ADDRESS BLOCK | TRACK CACHE | AD |
|---|---|---|---|---|---|---|---|---|---|---|
| 9.  | 00 | 0000000000 | 00 | 0008 | — | — | 00 | 00000000 | 02E0 | |
| 10. | 01 | 0000000001 | 04 | 0018 | — | — | 01 | 00000001 | 04E0 | |
| 11. | 02 | 0000000002 | 04 | 0090 | — | — | 03 | 00000002 | 0800 | |
| 12. | 03 | 0000000003 | 04 | 0050 | — | — | 03 | 00000003 | 0B80 | |
| 13. | 04 | 0000000004 | 00 | 0FB0 | — | — | 01 | 00000004 | 0EC0 | |

Line 3 begins the record flag portion of the track identification table and is comprised of five record flags namely, flags: 00; 01; 03; 03; and 01. Each of the record flags is associated with a corresponding record, in ascending order. Thus, record flag 00 is associated with data record 0; record flag 01 is associated with data record 1; and record flag 03 is associated with data record 2 and so forth.

A representation of a record modifier portion of the track identification and locator table is shown at lines 4–8 of Table 4. As discussed in conjunction with FIG. 5, the record modifier portion of the track identification and record locator table is read backwards beginning with the byte, "A0" of line 8.

The track identification and record locator table of Table 4 may be further understood in conjunction with lines 9–13. As shown on line 9, which identifies record 0 of this track, the second, third and fourth columns comprise the original "count" information of the CKD record. It should be noted that this record matches the description of the "expected" record utilized in the example associated with the method of FIG. 6 since the first record on the track is record 0, the key length is 0, and the data length is 8 bytes. Thus, the record locator flag associated with that record, "00" is the first record flag byte encountered on line 3.

Proceeding to line 10, record number 1 on the track has a key length of 04 and a data length of 18 and thus, deviates from the previously established "expected" data record and thus is assigned a record flag of 01.

Various codes which comprise the record flags are reproduced in Table 5 below wherein as shown in line 1, the code 00 means no change to the previously established "expected" record. As shown in line 2 of the table, record flag format 01 indicates that the first byte of the record modifier is the change flag byte, indicating that every bit flagged with a "1" points to the byte in the record identifier that should be replaced by the following bytes in the record modifier. The order of the record identifier is shown in line 7 of table 5 and begins with the key length, followed by data length (high), data length (low) and the first byte of the cylinder.

TABLE 5

RECORD FORMAT CHANGE CODES

| | | |
|---|---|---|
| 1. | ID FLAG FORMAT CODE 0: | NO CHANGE |
| 2. | ID FLAG FORMAT CODE 1: | 1ST BYTE OF MODIFIER IS THE CHANGE FLAG BYTE |
| 3. | | EVERY BIT FLAGGED POINTS TO BYTE IN THE |
| 4. | | ID THAT SHOULD BE REPLACED BY THE NEXT INFO BYTES. |
| 5. | | NUMBER OF EXTRA INFO BYTES IS THE NUMBER OF '1'S |
| 6. | | IN THE 1ST BYTE. THIS CODE IS USED IF WE CAN'T USE ANY OTHER CODE. |
| 7. | | :$K_L D_{LH} D_{LL} C$ CHHR |
| 8. | ID FLAG FORMAT CODE 2: | ONE BYTE INFO TO DL L + DL H = 2 |
| 9. | ID FLAG FORMAT CODE 3: | ONE BYTE INFO TO DL L + DL H = 0 |
| 10. | ID FLAG FORMAT CODE 4: | ONE BYTE INFO TO DL L DL H UNCHANGED |
| 11. | ID FLAG FORMAT CODE 5: | TWO BYTES INFO TO DL |
| 12. | ID FLAG FORMAT CODE 6: | ONE BYTE INFOR TO DL L + DL H = 1 |
| 13. | ID FLAG FORMAT CODE 7: | ONE BYTE INFO TO DL L + DL H = PATT FROM ID TABLE HEADER |
| 14. | ID FLAG FORMAT CODE 8: | DL L = PATT #0 FROM ID TABLE HEADER + DL H = 0 |
| 15. | ID FLAG FORMAT CODE 9: | DL L = PATT #1 FROM ID TABLE HEADER + DL H = 0 |
| 16. | ID FLAG FORMAT CODE A: | DL L = PATT #2 FROM ID TABLE HEADER + DL H = 0 |
| 17. | ID FLAG FORMAT CODE B: | DL L = PATT #3 FROM ID TABLE HEADER + DL H = 0 |
| 18. | ID FLAG FORMAT CODE C: | DL L = PATT #4 FROM ID TABLE HEADER + DL H = 0 |
| 19. | ID FLAG FORMAT CODE D: | DL L = PATT #5 FROM ID TABLE HEADER + DL H = 0 |
| 20. | ID FLAG FORMAT CODE E: | DL L = PATT #6 FROM ID TABLE HEADER + DL H = 0 |
| 21. | ID FLAG FORMAT CODE F: | DL L = PATT #7 FROM ID TABLE HEADER + DL H = 0 |

Thus, returning now to line 10 of table 4, the flag code 01 indicates that the first byte of the modifier namely, "A0" indicates the bits that are to be changed in the record identifier. Reading change byte A0 in conjunction with line 7 of Table 5 discloses that the successive bytes in the record modifier will modify the key length and data length (low) of the data record. The record modifier bytes in the track identification table modify the record identifier in reverse order as that shown in line 7 of Table 5 that is, from record number to key length. Thus, the second byte, "118" of the record modifier at line 8 of table 4 indicates that the previously expected data length is to be replaced with a data length (low) of "18", while the next byte of the record The building of a record identification and locator table in accordance with the present invention greatly reduces the amount of fixed block disk space required to store the "count" portion of a CKD formatted data record.

An additional example of a track level record identification and locator table is reproduced in table 6 below and is useful in showing an entry in the data pattern table previously described in conjunction with FIG. 7. Table 6 is a representation of a track identification table for an exemplary track number "D00" and is used for illustrative purposes only.

TABLE 6

1. TRACK NUMBER D00
2. FLAGS/COUNT/H/W/R/S/PAT/CACHE PTR: 11 81 00 00 00 C7 3E14181500FB9024 03FDE000
3. FLAGS 00A320 28 202020XX XXXXXXXXXXXXXXXX XXXXXXXXXXXXXXXX XXXXXXXXXXXXXXXX
4. XXXXXXXXXXXXXXXX XXXXXXXXXXXXXXXX XXXXXXXXXXXXXXXX XXXXXXXXXXXXXXXX
5. XXXXXXXXXXXXXXXX XXXXXXXXXXXXXXXX XX
6. BODY: XXXXXXXXXXXXXXXX XXXXXXXXXXXXXXXX XXXXXXXXXXXXXXXX XXXXXXXXXXXXXXXX
7. XXXXXXXXXXXXXXXX XXXXXXXXXXXXXXXX XXXXXXXXXXXXXXXX XXXXXXXXXXXXXX28

| | | | | | RECORD FLAGS | | | | | |
|---|---|---|---|---|---|---|---|---|---|---|
| REC | ID | KEY | DATA | WR | IN | FORMAT | PHYSICAL ADDRESS | | | |
| # | CCHHR | LENGTH | LENGTH | PEND | CACHE | CODE | BLOCK | TRACK | CACHE | AD |
| 8. 00 | 0000000000 | 00 | 0008 | — | — | 0 | 00047DB0 | 02E0 | | |
| 9. 01 | 0000000001 | 00 | 0028 | D. | D. | 3 | 00047DB1 | 04E0 | 03FDE118 | |
| 10. 02 | 0000000002 | 00 | 0028 | — | D. | 0 | 00047DB2 | 0700 | 03FDE150 | |
| 11. 03 | 0000000003 | 00 | 003E | — | D. | 8 | 00047DB3 | 0920 | 03FDE188 | |
| 12. 04 | 0000000004 | 00 | 003E | — | D. | 0 | 00047DB4 | 0B60 | 03FDE1D0 | |
| 13. 05 | 0000000005 | 00 | 003E | — | D. | 0 | 00047DB5 | 0DA0 | 03FDE218 | |
| 14. 06 | 0000000006 | 00 | 003E | — | D. | 0 | 00047DB6 | 0FE0 | 03FDE260 | | modifier, "04" is to replace the previously expected key length. It is in this manner that the system "reconstructs" the count portion of a CKD record from the "encoded" record Re,identification and locator table.

Record number 2, line 11 of Table 4 also has a key length of "04" but the data length changes to "90". Thus, a flag of 03 is entered. The record flag of 03, as shown at line 9, Table 5, indicates that the next sequential byte of information in the record modifier is to be used as the data length (low) and the data length (high) will equal 0. Thus, the next consecutive entry of "90" in the record modifier portion of the track identification table body is accounted for.

Similarly, the next byte of the modifier portion of the track identification table is "50" which is the changed data length of record 3 read in conjunction with a record flag of "03" at line 12 of Table 4.

The final record flag "01" in the record flag portion of this track indicates that the next sequential byte namely, "E0" in the record modifier portion of the table is the changed flag byte pointing to the bytes in the record identifier that are to be changed or modified by the subsequent bytes in the record modifier portion of the table. Code E0 indicates that the key length, data length (high) and data length (low) are to be changed by the three bytes which follow as indicated by line 7, table 5. Thus, byte "B0" of the record modifier is used as the data length (low); byte "0F" is used as the data length (high) byte, and byte 00 modifies the former key length entry.

On line 2 of table 6, the track "header" information is presented including the first byte "11" indicating that on this track, there is at least one record which is in cache; and at least one record which has a write pending, as previously explained in conjunction with Table 3. The second byte of the track header, "81" indicates there are 81 records in this track, while byte 5, "C7" is the CRC byte for this track. The next byte of the header, "3E" is the first byte of the data pattern table which extends for 8 bytes ending with "24". In this example, bytes 1–7 of the pattern table are not used, but are merely shown for illustrative purposes only. The last four bytes of the track header, "03 FD E0 00" is the cache beginning memory address at which any records from this track which are stored in cache are located.

Of particular interest in Table 6 is record 03 located at line 11. Since the data length, "3E" of record 3 is a deviation from the previously established data length "28", a record flag of other than 00 is expected, and thus the record flag "08" is entered. As can be compared from line 14 of the record flag codes in Table 5, record flag code "08" indicates that the data length (low) of this record identifier is to be loaded with pattern 0, the first pattern from the identification table header and thus, the "3E" pattern from line 2 of Table 6, is used as the data length for record number 3 when the system reconstructs the data record. The record flag, "28" which is shown and underlined on line 3 of table 6 also indicates that the data of this record is stored in cache. The cache address is ascertained by adding up the cache memory starting address (line 2) contained in the header of the track identification table along with the length of any intervening data or key information stored in cache.

Modifications and substitutions of the present invention by one of ordinary skill in the art are considered to be within the scope of the present invention, which is not to be limited except by the claims which follow.

What is claimed is:

1. A method of operating a data storage controller for storing information from variable-length data records on one or more fixed-block architecture (FBA) disk drives, said method comprising:

the data storage controller receiving a plurality of the variable-length data records, each of the variable-length data records including at least a record identification portion and a data portion;

the data storage controller storing at least data of each of the variable-length data records on said one or more FBA disk drives;

the data storage controller maintaining an index of record locator information specifying locations where data of the variable-length data records are stored on said one or more disk drives; wherein said index is accessible for obtaining record locator information of a specified variable-length data record for access to data of the specified variable-length data record on said one or more disk drives; and the data storage controller compressing the record identification portions of at least some of the variable-length data records to produce compressed record identification portions;

wherein the index of record locator information includes the compressed record identification portions.

2. A method of operating a data storage controller for storing information from count-key-data (CKD) variable-length data records on one or more fixed-block architecture (FBA) disk drives, said method comprising:

the data storage controller receiving a plurality of the CKD variable-length data records, each of ate CKD variable-length data records including at least a record identification portion and a data portion;

the data storage controller storing at least data of each of the CKD variable-length data records on said one or more FBA disk drives;

the data storage controller maintaining an index of record locator information specifying locations where data of the CKD variable-length data records are stored on said one or more disk drives; wherein said index is accessible for obtaining record locator information of a specified CKD variable-length data record for access to data of the specified CKD variable-length data record on said one or more disk drives; and the data storage controller compressing the record identification portions of at least some of the CKD variable-length data records to produce compressed record identification portions;

wherein the index of record locator information includes the compressed record identification portions.

3. A data storage controller for storing information from variable-length data records on one or more fixed-block architecture (FBA) disk drives, said data storage controller comprising:

a record receiver for receiving a plurality of the variable-length data records, each of the variable-length data records including at least a record identification portion and a data portion;

a data record storer for storing at least data of the variable-length data records on said one or more FBA disk drives;

a memory containing an index of record locator information specifying locations where data of the variable-length data records are stored on said one or more disk drives; wherein said index is accessible for obtaining record locator information of a specified variable-length data record for access to da of the specified variable-length data record on said one or more disk drives; and a data compressor for compressing at least the record identification portion of at least some of the variable-length data records to produce compressed record identification portions;

wherein the index of record locator information includes the compressed record identification portions.

4. A data storage controller for storing information from count-key-data (CKD) variable-length data records on one or more fixed-block architecture (FBA) disk drives, said data storage controller comprising:

a record receiver for receiving a plurality of the CKD variable-length data records, each of the CKD variable-length data records including at least a record identification portion and a data portion;

a data record storer for storing at least data of the CKD variable-length data records on said one or more FBA disk drives;

a memory containing an index of record locator information specifying locations where data of the CKD variable-length data records are stored on said one or more disk drives; wherein said index is accessible for obtaining record locator information of a specified variable-length data record for access to data of the specified variable-length data record on said one or more disk drives; and a data compressor for compressing at least the record identification portion of at least some of the variable-length data records to produce compressed record identification portions;

wherein the compressed record identification portions are included in said index.

5. A method of operating a data storage controller for storing information from variable-length data records on one or more fixed-block architecture (FBA) disk drives, said method comprising:

the data storage controller receiving a plurality of the variable-length data records, each of the variable-length data records including at least a record identification portion and a data portion;

the data storage controller storing at least data of each of the variable-length data records on said one or more FBA disk drives;

the data storage controller maintaining an index of record locator information specifying locations where data of the variable-length data records are stored on said one or more disk drives; wherein said index is accessible for obtaining record locator information of a specified variable-length data record for access to data of the specified variable-length data record on said one or more disk drives; and the data storage controller compressing the record identification portions of at least some of the variable-length data records to produce compressed record identification portions;

wherein the record identification portions of said at least some of the variable-length data records are included in said index, the storage controller compresses the index, and wherein the data storage controller compresses the record identification portions of said at least some of the variable length records to produce the compressed record identification portions when the storage controller compresses the index.

6. The method as claimed in claim 5, wherein the storage controller compresses the index when the index becomes full.

7. A method of operating a data storage controller for storing information from count-key-data (CKD) variable-length data records on one or more fixed-block architecture (FBA) disk drives, said method comprising:

the data storage controller receiving a plurality of the CKD variable-length data records, each of the CKD variable-length data records including at least a record identification portion and a data portion;

the data storage controller storing at least data of each of the CKD variable-length data records on said one or more FBA disk drives;

the data storage controller maintaining an index of record locator information specifying locations where data of the CKD variable-length data records are stored on said one or more disk drives; wherein said index is accessible for obtaining record locator information of a specified CKD variable-length data record for access to data of the specified CKD variable-length data record on said one or more disk drives; and the data storage controller compressing the record identification portions of at least some of the CKD variable-length data records to produce compressed record identification portions;

wherein the record identification portions of said at least some of the CKD variable-length data records are included in said index, the storage controller compresses the index, and wherein the data storage controller compresses the record identification portions of said at least some of the CKD variable-length data records to produce the compressed record identification portions when the storage controller compresses the index.

8. The method as claimed in claim 7, wherein the storage controller compresses the index when the index becomes full.

9. A data storage controller for storing information from variable-length data records on one or more fixed-block architecture (FBA) disk drives, said data storage controller comprising:

a record receiver for receiving a plurality of the variable-length data records, each of the variable-length data records including at least a record identification portion and a data portion;

a data record storer for storing at least data of the variable-length data records on said one or more FBA disk drives;

a memory containing an index of record locator information specifying locations where data of the variable-length data records are stored on said one or more disk drives; wherein said index is accessible for obtaining record locator information of a specified variable-length data record for access to data of the specified variable-length data record on said one or more disk drives; and a data compressor for compressing at least the record identification portion of at least some of the variable-length data records to produce compressed record identification portions;

wherein the record identification portions of said at least some of the variable-length data records are included in said index, and wherein the data compressor is operative for compressing the index.

10. A data storage controller for storing information from count-key-data (CKD) variable-length data records on one or more fixed-block architecture (FBA) disk drives, said data storage controller comprising:

a record receiver for receiving a plurality of the CKD variable-length data records, each of the CKD variable-length data records including at least a record identification portion and a data portion;

a data record storer for storing at least data of the CKD variable-length data records on said one or more FBA disk drives;

a memory containing an index of record locator information specifying locations where data of the CKD variable-length data records are stored on said one or more disk drives; wherein said index is accessible for obtaining record locator information of a specified variable-length data record for access to data of the specified variable-length data record on said one or more disk drives; and a data compressor for compressing at least the record identification portion of at least some of the variable-length data records to produce compressed record identification portions;

wherein the record identification portions of said at least some of the CKD variable-length data records are included in said index, and wherein the data compressor is operative for compressing the index.

* * * * *

UNITED STATES PATENT AND TRADEMARK OFFICE
CERTIFICATE OF CORRECTION

PATENT NO. : 6,418,509 B1
DATED : July 9, 2002
INVENTOR(S) : Yanai et al.

It is certified that error appears in the above-identified patent and that said Letters Patent is hereby corrected as shown below:

Column 15,
Line 34, change "ate" to -- the --;

Column 16,
Line 4, change "da" to -- data --.

Signed and Sealed this

Twenty-seventh Day of August, 2002

Attest:

JAMES E. ROGAN
Attesting Officer          Director of the United States Patent and Trademark Office